United States Patent [19]

Young

[11] Patent Number: 5,416,848
[45] Date of Patent: May 16, 1995

[54] METHOD AND APPARATUS FOR MANIPULATING COLORS OR PATTERNS USING FRACTAL OR GEOMETRIC METHODS

[75] Inventor: Fredric S. Young, Los Altos, Calif.

[73] Assignee: Chroma Graphics, Woodside, Calif.

[21] Appl. No.: 895,510

[22] Filed: Jun. 8, 1992

[51] Int. Cl.⁶ .......................... G06K 9/36; G06K 9/46
[52] U.S. Cl. .................... 382/191; 382/232; 382/276; 395/141
[58] Field of Search ........... 382/41, 44, 17, 56; 340/750, 778, 799; 395/119, 141, 120, 125, 133, 152, 162; G06K 9/36, 9/32, 9/46, 9/66; G09G 1/14, 3/22, 3/28, 1/02; G06F 15/00

[56] References Cited

U.S. PATENT DOCUMENTS

| | | | |
|---|---|---|---|
| 4,694,407 | 9/1987 | Ogden | 395/141 |
| 4,941,193 | 7/1990 | Barnsley et al. | 382/56 |

*Primary Examiner*—Jose L. Couso
*Attorney, Agent, or Firm*—Townsend and Townsend Khourie and Crew; Kenneth R. Allen

[57] ABSTRACT

Colors for a two-dimensional ordered image such as a fractal map are selected by first sampling colors from a real or natural source of colors, such as a tree or a feather and storing values representing the colors in Munsell color space (the three-dimensional space defined by hue, saturation and value) in a source color file, then ordering colors by distance in Munsell color space from a seed reference color (e.g. black), thereafter storing a representation of the color whose distance is closest to the seed reference color as the first color in a storage file known as an ordered color file, using the first color as a new reference color, then sorting the remaining colors according to distance from the new reference color, and storing a representation of the color closest to the new reference color as the second color in the ordered color file. The process is recursively performed until all colors in the source color file have been ordered in the ordered color file. The ordered color file can be mapped into any ordered set, such as a fractal set which is naturally ordered, by assigning the colors of the ordered color file according to the fractal value representing the higher dimension of the fractal set. Colors lost in the color sampling process can be recovered by interpolation between discrete values in the ordered color set. Interpolation is an effective form of data compression of colors.

22 Claims, 8 Drawing Sheets

METHOD AND APPARATUS FOR MANIPULATING COLORS OR PATTERNS USING FRACTAL OR GEOMETRIC METHODS

BACKGROUND OF THE INVENTION

This invention relates to the mathematical analysis and manipulation of ordered information, such as color, specifically for the mapping of complex color effects onto images encoded using fractal geometry and computer graphic image technology.

This invention derives elements from the fields of color science, fractal geometry and information visualization in computer graphics. Various systems have been used to represent colors. Computers usually represent color by the amount of red, green and blue components, and printing uses the four component cyan, yellow, magenta and black. Human color vision is based on a system of primary receptors for red, yellow and blue.

The first standardization of the specification and quantitative classification of color and the differences between color occurred in 1931. The Commission Internationale d'Elairage (CIE-The International Commission on Illumination) picked the lighting standards under which color would be measured and classified. A filter was used which produced a spectrum very close to daylight when illuminated with a tungsten lamp at the proper temperature, this became known as Illuminant Standard C. A second standard called Illuminant Standard A was adopted which has a similar energy distribution to a gas-filled tungsten lamp.

The measurement of color was standardized using a tri-stimulus system. $\bar{X}$ represents the spectral color red at 600 nm, and X represents a standard more saturated than $\bar{X}$. Y and $\bar{Y}$ represent a more saturated standard and spectral green respectively at 520 nm, and Z and $\bar{Z}$ represent a more saturated standard and spectral blue at 477 nm. Any color can be represented thereby by integrating over the region of the spectrum which represent the peaks for the red, green and blue standards. The calculations are lengthy and computerized spectrophotometers and photoelectric cells are commonly used. The color standards were chosen so that the green standard matched exactly the reading for that wavelength on a curve of luminosity/unit of power as a function of wavelength. In this way the luminance of colors can be related to the luminance of pure white or black.

Because color is represented, measured and quantified using color space, graphical methods are useful for visualizing aspects of color space. Because color space is a three-dimensional entity, it is difficult to represent graphically in two dimensions. For this reason, a two-dimensional system was developed called the chromaticity diagram. The red component of a color described using the tri-stimulus system is given by the formula $x=X/(X+Y+Z)$. The green component is $y=Y/(X+Y+Z)$ and blue is $z=Z/(X+Y+Z)$. Because $x+y+z=1$, only two of these quantities are independent and color can be represented by graphing two of the above quantities. Colors can be plotted on the x-y, x-z and y-z planes. The y-x plane is normally used for the chromaticity diagram.

The chromaticity diagram allows additive color mixture to be accomplished graphically. This cannot be done using the RGB tri-stimulus coordinates of two colors. The chromaticity diagram has a serious limitation for color measurement and the visualization of relationships between colors. A chromaticity diagram is a two-dimensional projection of a three-dimensional space. It contains distortions similar to those seen in the two-dimensional Mercator projection of the earth commonly used in maps. The distances between two colors in the chromaticity diagram do not necessarily accurately reflect their actual positions in color space.

The system just described is mainly used for quantitative color specification. To represent color in a manner which is most useful in the fields of art, design, and color photography requires a system of color ordering. The attempt to order colors has a rich history. It is believed that Leonardo da Vinci was the first to attempt color ordering by painting similar colors close to one another, and different colors further away. Newton was the first to arrange the hues in a circle with complementary hues occupying opposite positions on the circle. In 1745, Moses Harris arranged colors of the same hue but increasing saturation at increasing distances from the center along the radius of a circle.

Ostwald in the early 1900s distributed grays between black and white along an axis perpendicular to the circle of hues. Ostwald used a double cone for color space, a system that did not accurately reflect the quantitative relationships. The Ostwald system was the first to order color as a function of all three descriptive variables. These are most commonly called hue, saturation and value. Hue is the actual color such as red, green or blue. Saturation is the amount of the color. Colors with very low saturation are almost on the grey scale. Value is the same as brightness. Value orders colors with hue along the grey scale from black with O value to white with a maximum value.

The double cone of the Ostwald system is not a true representation of color space. Each hue can vary in both brightness and saturation. The true space of hue, saturation, and value (brightness) is a cylinder. At the same time that Ostwald developed his color ordering system, the artist Munsell prepared a series of cards which represented the saturation and value or brightness of different hues. He developed cards for ten hues, ten value gradations and three to eight saturation steps for each view. These cards have been commercially available since 1904. The Munsell system has been very useful for artists and designers because it provides a logical and correct ordering of colors.

A technical analysis of color shows that hue corresponds to spectral frequency range, brightness corresponds to amplitude (as a function of frequency) and saturation corresponds to signal-to-noise ratio (as a function of frequency).

The Optical Society of America has evaluated the color order systems and used human observers to develop uniform color scales representing the color continuity and metric. A standardized set of scales was adopted in 1974. The optical society decided to adopt a set of 500 colors in Munsell color space that allowed arrangement into the maximum number of scales. A committee was employed to locate 500 points of equal perceptual distance in the three-dimensional color space based on the Munsell system. The lattice of points was arranged and depicted as colored spheres in a regular rhombohedral crystal. Each point in the lattice is equidistant from twelve other points. A three-dimensional model of this space was built using colored balls. This model contains 422 uniform scales of three or more steps.

The beauty of color use in art is based on the use of such color scales where colors are changed in graded steps. The model constructed by the optical society represents the current state of the art in the visualization of color scales. However, most books on color for artists and designers are restricted to a few major color scales. Tint scales add increasing amount of the achromatic color white to pure hues. Shade scales add increasing amount of achromatic black to pure hues. Tone scales add increasing amounts of colors on the grey scale. There are also "uniform chroma" scales which are tint, tone, or shade scales with compensating amounts of pure hue added to keep saturation constant.

The physical representation of color scales by the Optical Society of America is by no means complete. The lack of completeness has been underscored by the development of twenty-four-bit computer graphic systems which have made palettes of 16.8 million colors available for use. This is a much wider range of color choice than has ever been available to an artist. There have been no tools which enable the visual artist to take full advantage of this color capability. Even the best twenty-four-bit computer painting programs lack techniques which allow color use in computer graphics to come close to the remarkable display of colors in nature. This is one of the starting points for the present invention. What is needed is a systematic tool for utilizing the full color possibilities of twenty-four-bit graphics.

This invention also relates to the visualization of information. The process of map making has been expanded to such maps as maps of galaxy distribution, maps of brain activity, maps of genes on the human genome, and satellite maps of the earth and ocean surfaces. In addition, there is increasingly sophisticated medical imaging and visualization in complex data bases. Many maps use Color to reveal pattern. Heretofore, color choice has been arbitrary and without a systematic method of choosing and scaling colors that best highlight the patterns.

The present invention further relates to fractal geometry, a geometry of fractional dimensions which describes objects or sets via the procedures which generate them. It has been called a geometry of nature, since it describes forms which occur naturally, such as trees, rocks, and clouds, as readily as Euclidean geometry describes triangles, squares, and circles. Fractal geometry describes a complex shape through a recursive procedure used to generate it. An initiator is defined which is a starting line segment, or shape. A "generator" is next formulated, a generator being an operation performed on the initiator which changes it into a more complex shape having multiple copies of the initiator. The generator is employed repeatedly in generations inheriting characteristics of prior generations. In a second application of the generator, the generating procedure is performed on each of the initiators in the first generation. This is continued recursively to a limit which produces a shape that is an "attractor" for that operation.

These definitions have been generalized mathematically to describe what are called Iterated Function Systems (IFS). IFS defines a fractal set as the attractor for a group of linear algebraic transformations which include translation, rotation and dilation. These transformations can be extended to include non-linear transformations. Through this method, the information in a complex object can be reduced or compressed to a simple set of descriptions recitable as algebraic equations for the transformations which converge on an invariant set describing the object.

In order to understand the area of contribution of the present invention, it is useful to consider certain subdisciplines of fractal geometry. The first is in the visualization of mathematical landscapes which evolved from a branch of pure mathematics resulting from the study of polynomial equations. A study of the critical points of the quadratic equation when iterated and studied as a dynamic system resulted in the subdiscipline of nonlinear fractal mappings. A map is made which is called a dynamic plane map. Each point is input into the physically and mathematically significant equation known as the quadratic equation:

$$Ax^2 + Bx + C = 0,$$

which is then solved recursively. Any equation of this form can be conjugated by a coordinate shift to a form:

$$(x^2 + c) = 0.$$

This process generates an orbit, which in the case of the quadratic equation either gets larger, smaller or remains bounded, following a complex (seemingly chaotic) but precise deterministic orbit whose period is generally greater than the resolution of the system of examination. Those points which remain bounded during the iterative mapping are the set of periodic repelling points and are called Julia sets. (All other points on the complex plane for this mapping follow simpler orbits to attractors and are called Fatou sets.) Julia sets are extremely intricate in form and are considered beautiful when expressed visually. A simple technique for expressing a Julia set visually is to make a map, wherein each point of the Julia set is coded as black if it gets smaller or follows a complex orbit to a point of filling a boundary defined by the Fatou set, and is coded white if it gets larger. The quadratic equation has a constant C whose value varies over a certain range. The value C determines the shape of a particular Julia set.

Maps can also be made of the parameter plane where each point represents the value of the parameter C. A parameter plane map is made where each point represents the orbit of the critical point for the Julia set with that C value. As with the Julia sets, this map represents the dynamic category for each point, as it does in the dynamic plane maps.

The dynamic and parameter plane maps contain extremely intricate details which can be revealed by use of color. Maps can be rendered in color using what is called the escape time algorithm wherein those points in a map which are in the category of getting larger are considered to be escaping. Each of these points can be color coded as to the time of escape. The maps that result from using this algorithm are equivalent to contour maps, where a color must be associated with each height. Known color mapping techniques rely on arbitrary choices of colors.

These fractal maps are extremely intricate, and it is difficult to arrive at effective mappings of color onto contour. There are no methods for preparing color palettes for mapping onto fractal maps which can produce color effects to match the sophistication of the geometry. A technique for algorithmically ordering color which matches the sophistication of the detail in the fractal maps would be highly useful.

Another subdiscipline of fractal geometry which can benefit from this invention is fractal landscape generation. Fractal geometry describes many processes in nature, one of which is Brownian motion. This can be represented as random changes in direction of segments of a surface and so generate interesting contours. These are being widely used in computer graphics and even in movie scene generation. Color must be mapped onto these mathematical objects. There is no systematic method of getting realistic effects.

Another subdiscipline of fractal geometry of interest is in fractal image encoding. Barnsley (U.S. Pat. No. 4,941,193) describes a method of using fractal geometry to encode complex images as algebraic transformations. This has application in image compression. These methods can also be used to simulate nature and produce representations of interesting variations on nature. Barnsley utilizes a method of representing a fractal which uses probabilistic iterated function systems where each of the transformations making up part of an image is applied with some preselected probability. The image may be described by a combination of an underlying attractor covered with a distribution of arbitrarily fine grains of dust or sand. After the image is recursively generated mathematically, it can be expressed as a rastered image of pixels wherein the amount of sand in each pixel is summed to produce a number. This number is analogous to the escape time in the escape time algorithm in that it must be mapped onto a color. What is needed are systematic methods for controlling color which can match the capabilities for controlling the geometry.

Any one of these subdisciplines yields an ordered two-dimensional fractal set wherein a number or value at any location in two dimensions is assigned to each point in the fractal set representing a position in a higher (third) dimension.

Known methods of applying color to complex images have been found to be unsatisfactory and aesthetically unsatisfying. While fractal mathematics may capture the mathematics of natural form, there has been no way of also applying the mathematics of natural coloration to fit with the mathematics of natural form.

SUMMARY OF THE INVENTION

According to the invention, features such as colors for any ordered image, such as a two-dimensional fractal map, are selected by first sampling color terms from a real or natural source of colors, such as a tree or a feather, and storing terms representing the colors in Munsell color space (the three-dimensional space defined by hue, saturation and value) in a source color file, then ordering colors by distance in Munsell color space from a reference color, initially a seed color (e.g. black), thereafter storing a representation of the color whose distance is closest to the reference color as the first color in a storage file known as an ordered color file, using the first color as a new reference color, then sorting the remaining colors according to distance from the new reference color, and storing a representation of the color closest to the new reference color as the second color in the ordered color file. The process is recursively performed until all colors in the source color file have been ordered in the ordered color file. The ordered color file can be mapped into any ordered set, such as fractal set which is naturally ordered, by assigning the colors of the ordered color file according to the fractal value representing the higher dimension of the fractal set. Colors lost in the color sampling process can be recovered by interpolation between discrete values in the ordered color set. The ability to interpolate makes the present invention an effective form of data compression of colors.

The present invention provides systematic tools for choosing appropriate palettes for various maps and scaling the color transitions to best highlight the desired features. The present invention can prepare color mapping functions which are able to greatly enhance the effects obtainable with simulated geographies.

DESCRIPTION OF SPECIFIC EMBODIMENTS

Figure 1:
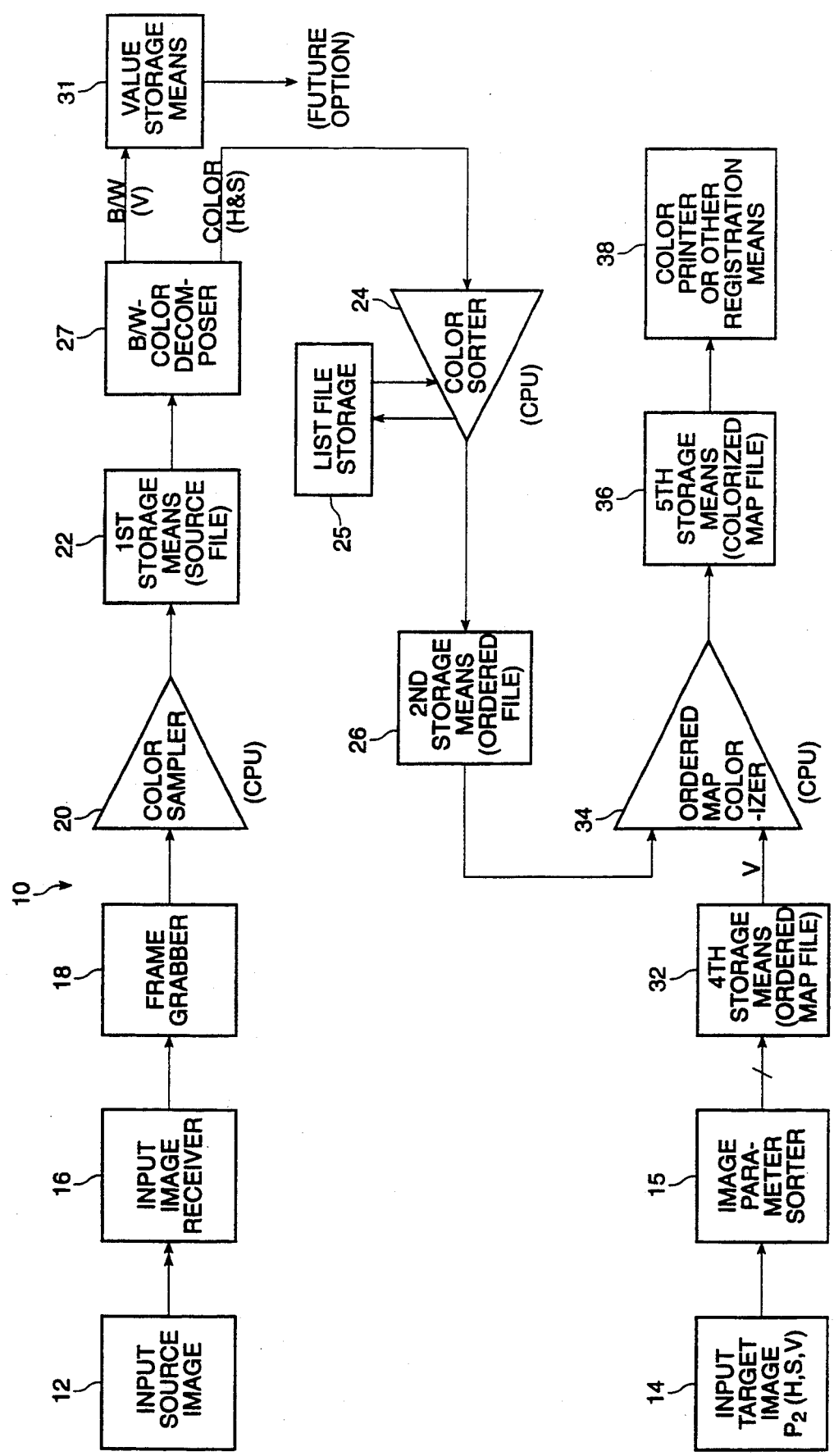
FIG. 1 is a block diagram of a system for use according to the invention.

Referring to FIG. 1, there is shown a block diagram of a system 10 according to the invention. The system 10 operates on two inputs, an input source image 12 and an input target image 14. The colors of input source image 12 may be derived directly from a real object, photograph, art print, painting or the like. An input image receiver 16 may be in the form of a video camera or alternatively an image scanner. While a computer-generated image may be used as an input medium, one of the present purposes of the invention is to overcome the problems of aesthetically poor color use in computer-generated images to capture a range of colors from a real-world object.

The output of the input image receiver is coupled to a frame grabber 18, which is a device (frequently integrated with a scanner) which captures and thus freezes a frame in a memory for subsequent use or analysis, converting the image into a conventional computer file format consisting of a bit map of the image or a standard pixel graphics file of red-green-blue (RGB) colors. The output of the frame grabber 18 is coupled to a color image sampling means 20 which converts the multiple-color RGB image into a twenty-four-bit reduced color image. A suitable color image sampling means 20 is an computer program such as PhotoShop by Adobe Systems of Mountain View, California operating on a Macintosh II-type computer of Apple Computer of Cupertino, Calif. Other means are also suitable.

The color image sampling means 20 produces a desired color source file which is stored in a first video storage means 22. The color source file contains preferably the 256 colors best suited to reproduce the range of colors of the source input image 12.

According to the invention, a color sorting means 24 is provided for sorting the color source file into a logical color order for colorizing a target image. The color sorting means 24 is embodied in a dedicated processor or in a set of computer programs which operates as hereinafter explained. In connection with a buffer for temporary storage, called list file storage 25, the color sorting means 24 generates an ordered file which is ordered by color position in Munsell color space, since it corresponds to the twenty-four-bit color specification. The ordered file is stored in a second storage means 26. The second storage means 26 is coupled to provide input to an ordered file reconstructor 27, which closes the ordered file and rescales the ordered file over the same number of points as the ordered file in the second storage means 26. The closed ordered file is stored in a third storage means 29 or equivalent for further processing.

A second system input is taken from the input target image 14. This input image provides a map wherein each spatial position (x,y) is associated with a third coordinate (z) or term representing some feature of the map. The term could represent height, density or any other continuous variable that can be associated with a number.

Figure 2:
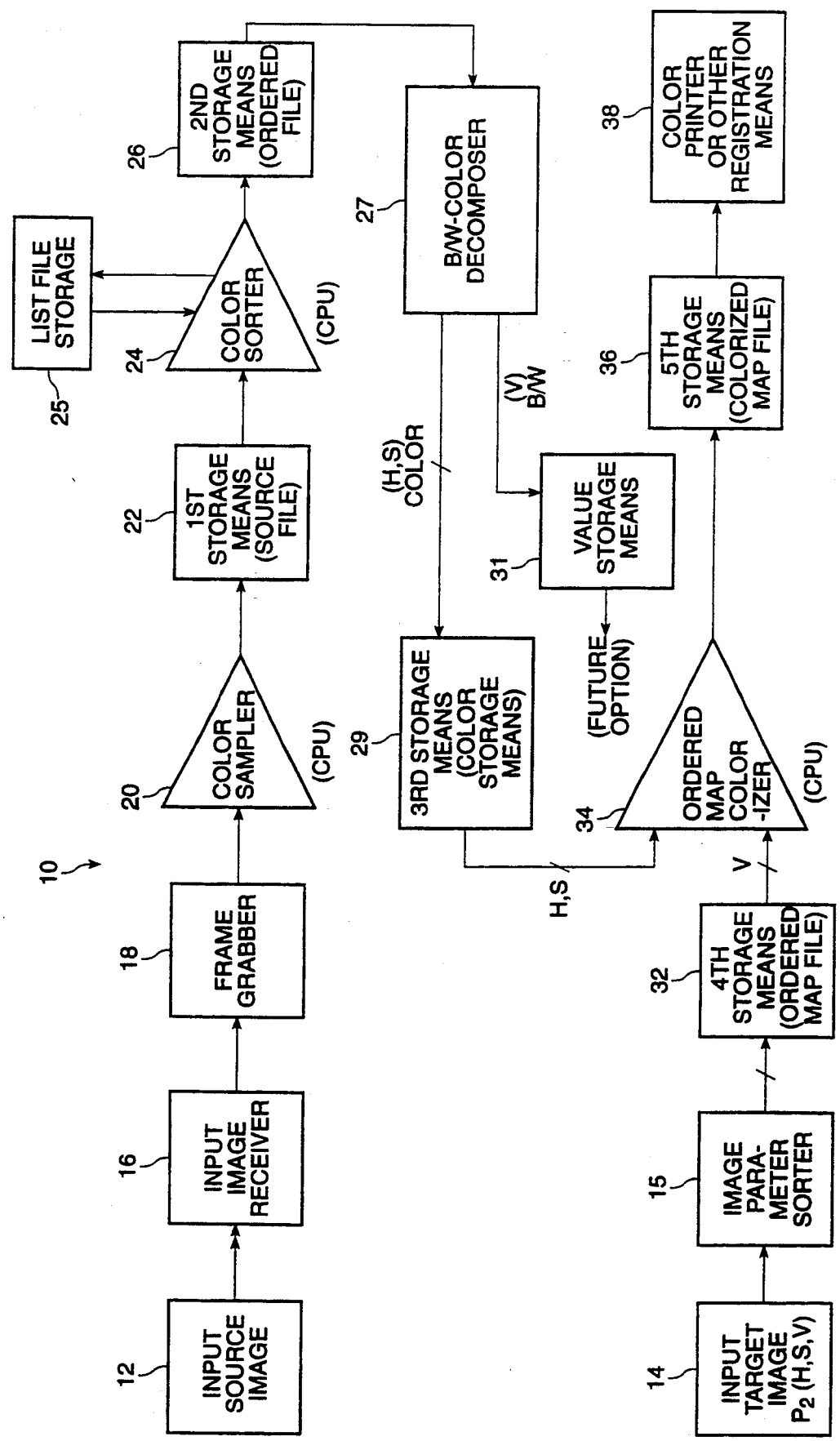
FIGS. 2a and FIG. 2b are illustrations of different types of fractal maps.

Referring to FIG. 2a and FIG. 2b, there are shown two simply-generated representative images, a depiction representing a Mandelbrot fractal set 28 (FIG. 2a) and a depiction of an image generated from a compressed iterated function system (IFS) code of a cactus 30. An example of an application of IFS coding is described in the Barnsley reference (U.S. Pat. No. 4,941,493). The target image can be any image having numeric values of features. The target image can even be a bitmapped image presorted by the ordering process in accordance with this invention, as well as any terrain map (which is inherently ordered), a landsat image of a surface, a medical scan, a mathematical map, a parameter space map, an isovariable map of a random fractal surface or landscape, a map of a mathematical equation using the escape time algorithm, or a dynamical system mapped image sorted according to like colors, such as a Mandelbrot or Julia Set image. If possible, the map of the target image 14 is organized according to the pixels associated with any particular number. If this is not possible, a bitmapped image can be adapted for use with the invention simply by applying it as input to the color (feature) sorter of the present invention.

The input target image 14 is stored in a fourth storage means 32 (FIG. 1) as an ordered map file. The two ordered files from the third storage means 29 and the fourth storage means 32 may thereafter be mapped onto one another. An ordered map colorizer 34 receives as input both ordered files from the third storage means 29 and the fourth storage means 32. The ordered color file is simply aligned with the terms of the ordered map, and the results may be displayed directly or preferably stored in a fifth storage means 36 as a colorized map file. The colorized map file may thereafter be presented in a twenty-four-bit color output device 38, such as an RGB display monitor, a high-resolution twenty-four-bit graphics color printer or film recorder/slide maker. A slide maker may produce a slide which can be used for printing photographic images on any permanent medium, such as paper, fabric or ceramic. The colorized map file can also be used as input to other output devices, such as numerically controlled looms.

DESCRIPTION—OPERATION

Figure 3:
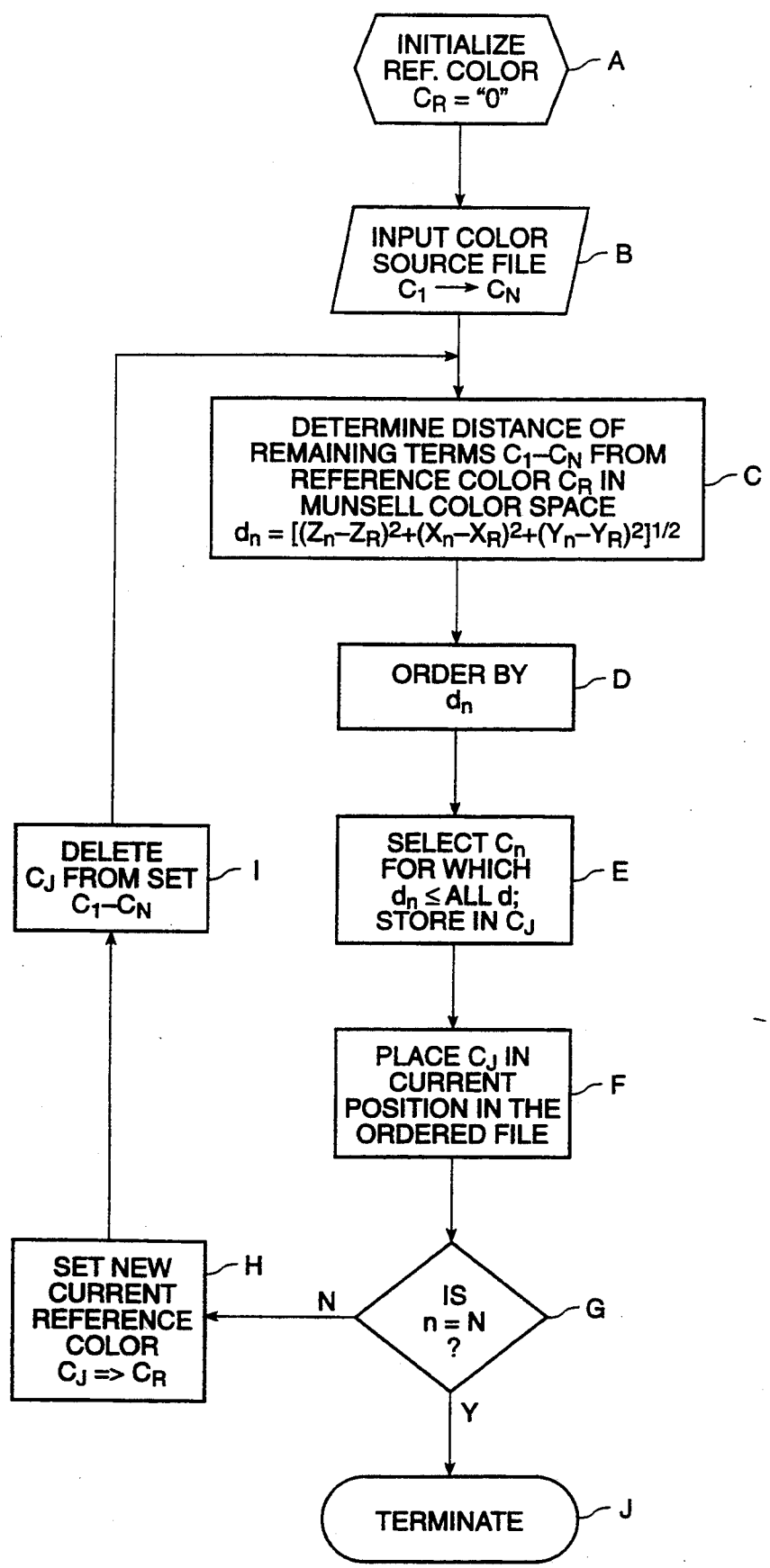
FIG. 3 is a flow chart of a process according to the invention.

Referring to FIG. 3, operation of the invention is described in relationship to colors. Is should be understood that other features, such as shading, texture or representations of natural sequences, could be used as an input. Color is used as the example, since it is most easily visualized as a feature of a two-dimensional image, and since it has direct and immediate commercial application. A reference color or initial reference $C_R$ is established by initialization (Step A). The reference color is typically the value representing black. An object or photograph is then input. The original image is digitized in twenty-four-bit form where the red, green, or blue component of each pixel can have a value of from 1 to 256. The total number of colors which this system can represent is $256^3$ or 16.8 million. The color sampler picks 256 colors which are best able to reproduce the original image. The input values are converted and stored to a digital file of values $C_1$ through $C_N$ using a scanner or video camera (Step B). These 256 colors are stored as a list in no particular order. This file will be referred to as the source file.

In the next step, the source file is tested to determine the distance of each of the current (remaining) terms $C_1$, $C_2, \ldots, C_N$ in the source file, excluding the value $C_R$ (Step C). If the color is stored in RGB form, it is first necessary to convert the color to the alternative color representation system of Hue, Saturation, and Value in Munsell color space, the Munsell system of color representation being the standard adopted by the American Optical Society for color ordering. The distance measurement is done using the mathematical formula for the distance between two points in three dimensional space:

$$d = sqrt[(hue_{ref} - hue_{color} 1)^2 + (saturation_{ref} - saturation_{color} 1)^2 + (value_{ref} - value_{color} 1)^2].$$

In a generalized function, hue=X, saturation=Y and value=Z.

The distance function is calculated between the reference color and each color in the source file. These distance values are all stored temporarily in the list file storage area 25 associated with the color sorter 24 of the computer. This storage 25 is for the file referred to the list file.

In the next step the list file is ordered from least to greatest distance (Step D), and then a color $C_J$ is selected which is the color $C_n$ which is smallest distance from the initial reference color $C_R$ (Step E). This color $C_J$ is then stored in the current (e.g., first empty) position in the ordered file of the second storage means 26 (Step F). A test is made to determine whether all N colors have been placed in the ordered file (Step G). If not, the reference color $C_R$ is replaced by the current color $C_J$ (Step H), and the color $C_J$ is removed from the set $\{C_1, \ldots, C_N\}$ (Step I). Steps C, D, E, F, and G are then repeated on the new smaller set with the current reference color to obtain a new ordered color. The process is terminated (Step J) after about 32,000 steps. The result is a valuable computer file with subsequent applications as hereinafter described.

Figure 4:
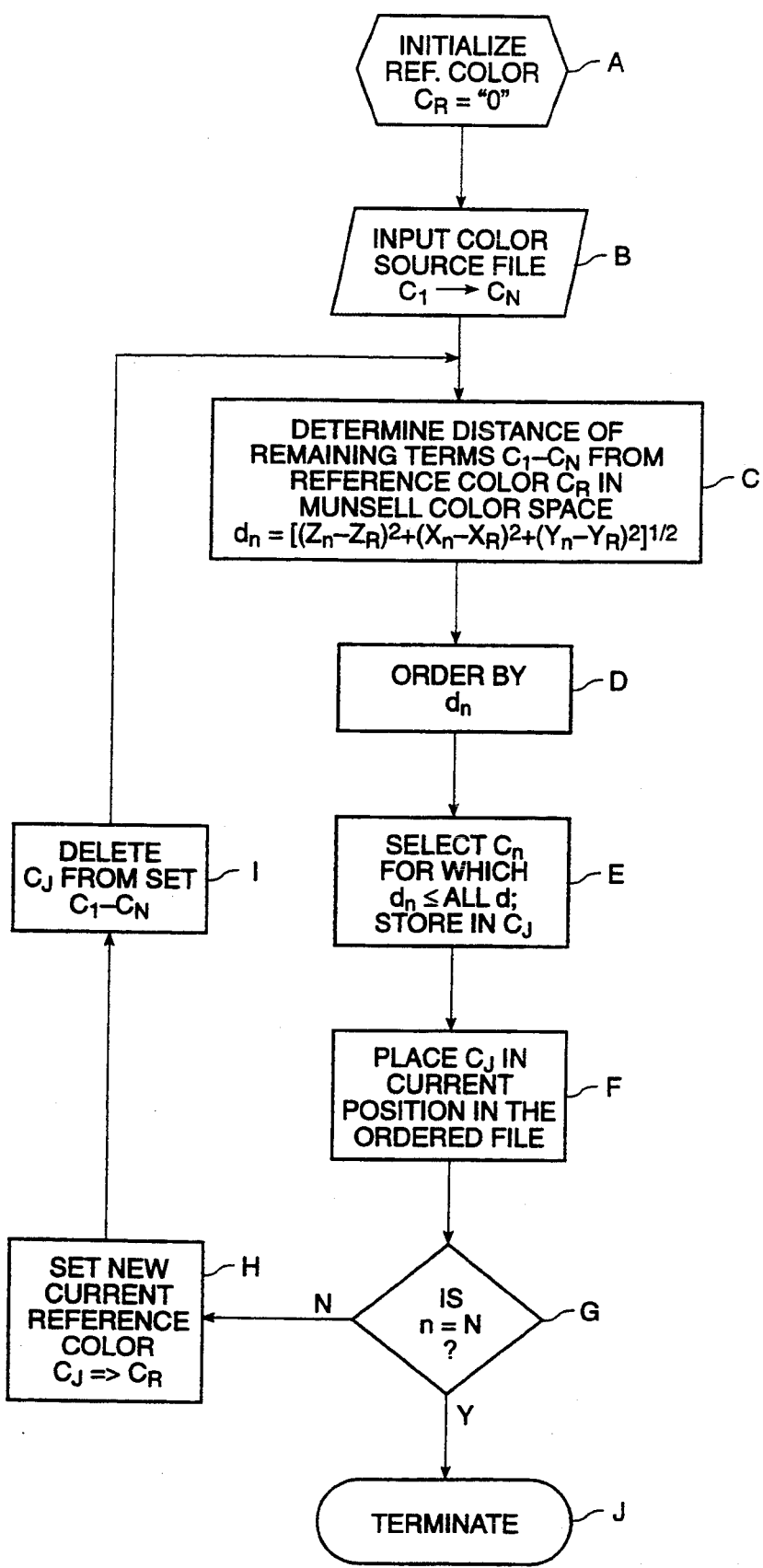
FIG. 4a is a standard depiction of Munsell color space.
FIG. 4b is a trajectory according to the invention of an ordered color file in Munsell color space.

FIG. 4a is a standard representation of Munsell color space 40 which is a cylinder which has polar coordinates (radius Y and angle X) and height Z. FIG. 4b is a trajectory 42 through the Munsell color space 40. The ordered file of second storage means 26 contains the trajectory 42 of the colors through the Munsell color space 40 generated by selecting the smallest distance between colors (features) from the source file. The ordered file is a signature which uniquely represents the color usage of an image as a mathematical function in a multidimensional space. Most importantly, in a specific embodiment of a color space, this signature captures the color transitions in an image. It is believed that these color transitions give rise to the aesthetically-pleasing and remarkable color effects seen in nature. The ordered color file according to the invention allows nature's coloring scheme to be made available in an orderly form to a designer or artist.

The creation of the ordered color file shows that an object or image exploits a certain region of color space. This invention allows one to visualize the path an image or object takes as it explores color space.

Figure 5:
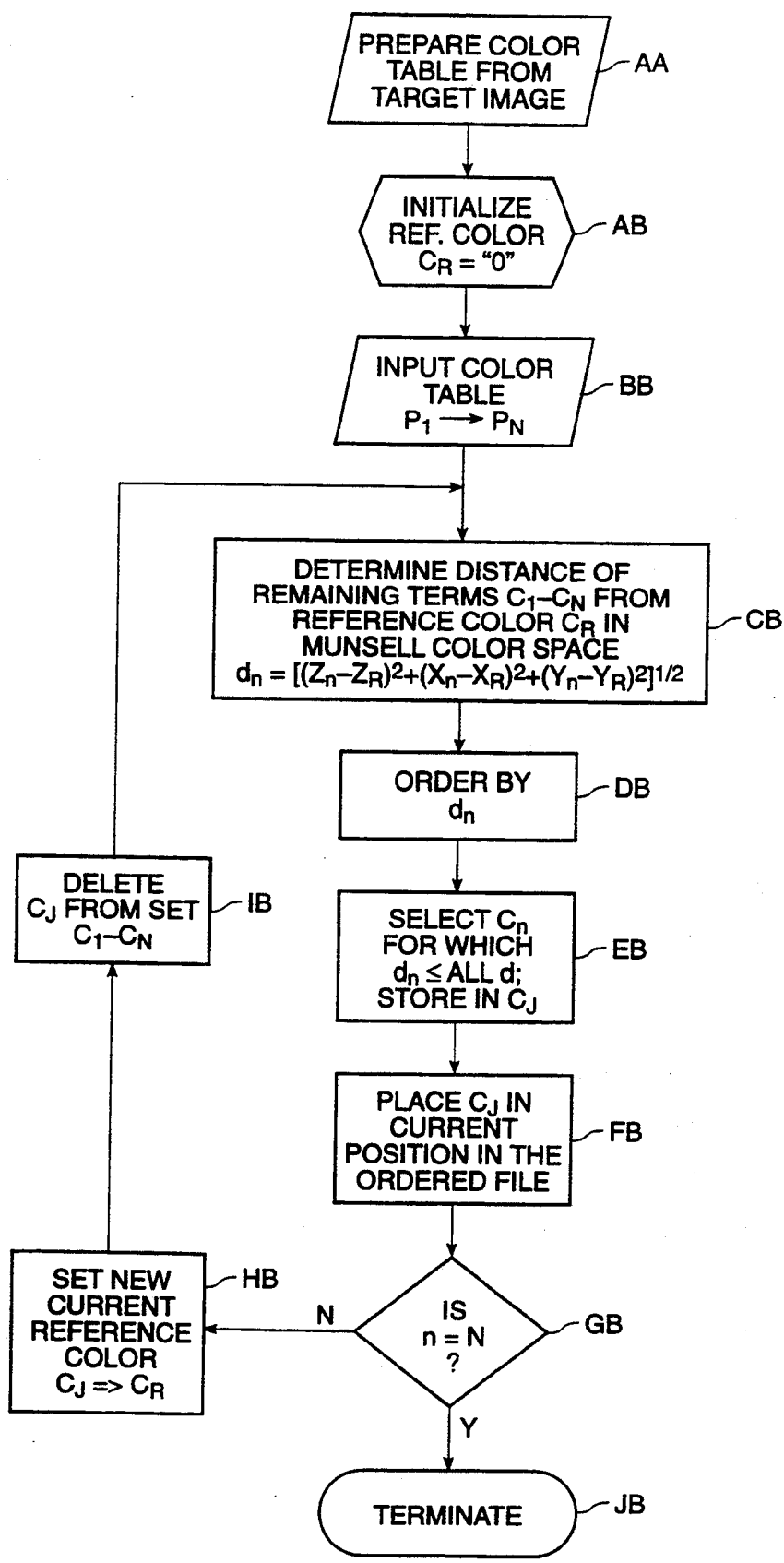
FIG. 5 is a flow chart for interpolating and smoothing palettes so as to optimize the coloring of a target image.
Figure 6A:
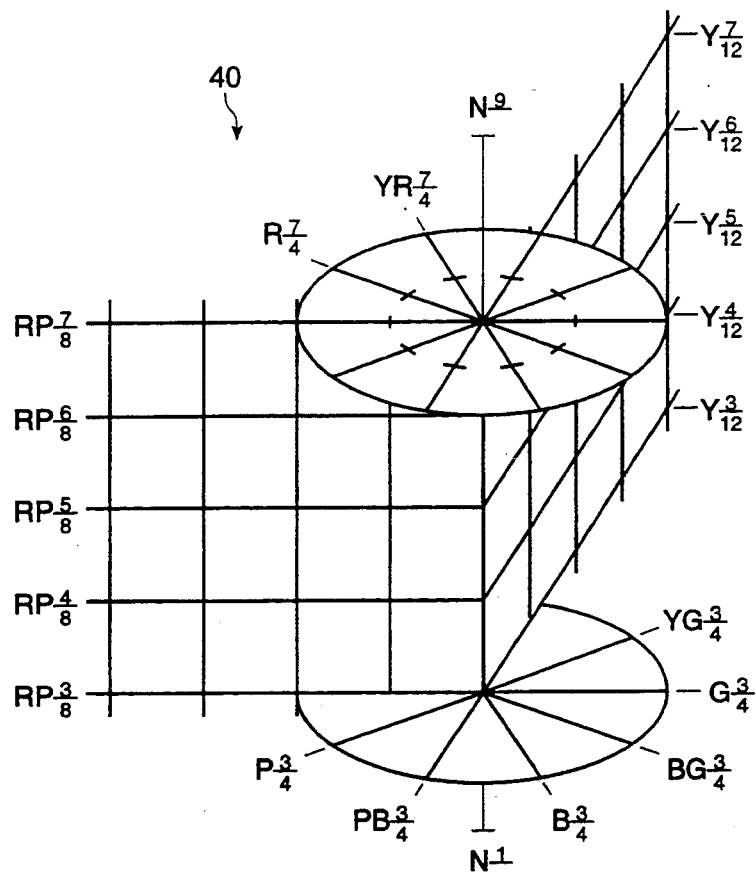
Figure 6B:
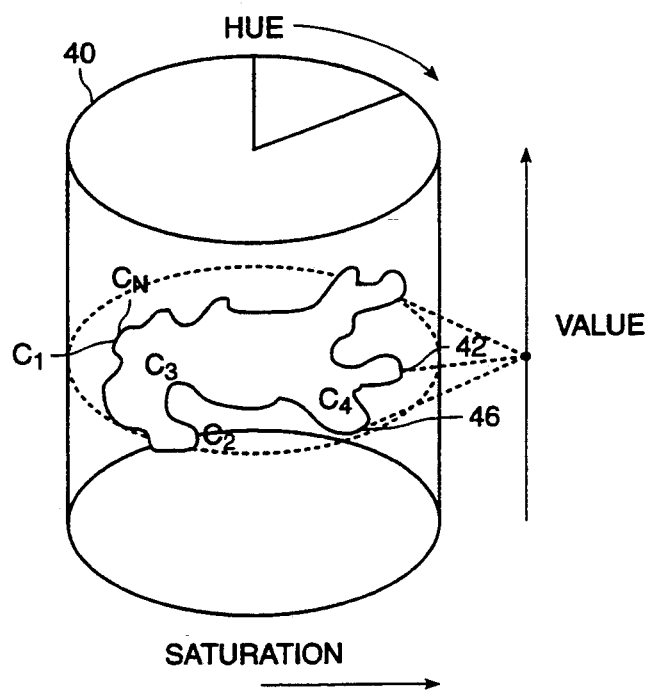
Figure 7A:
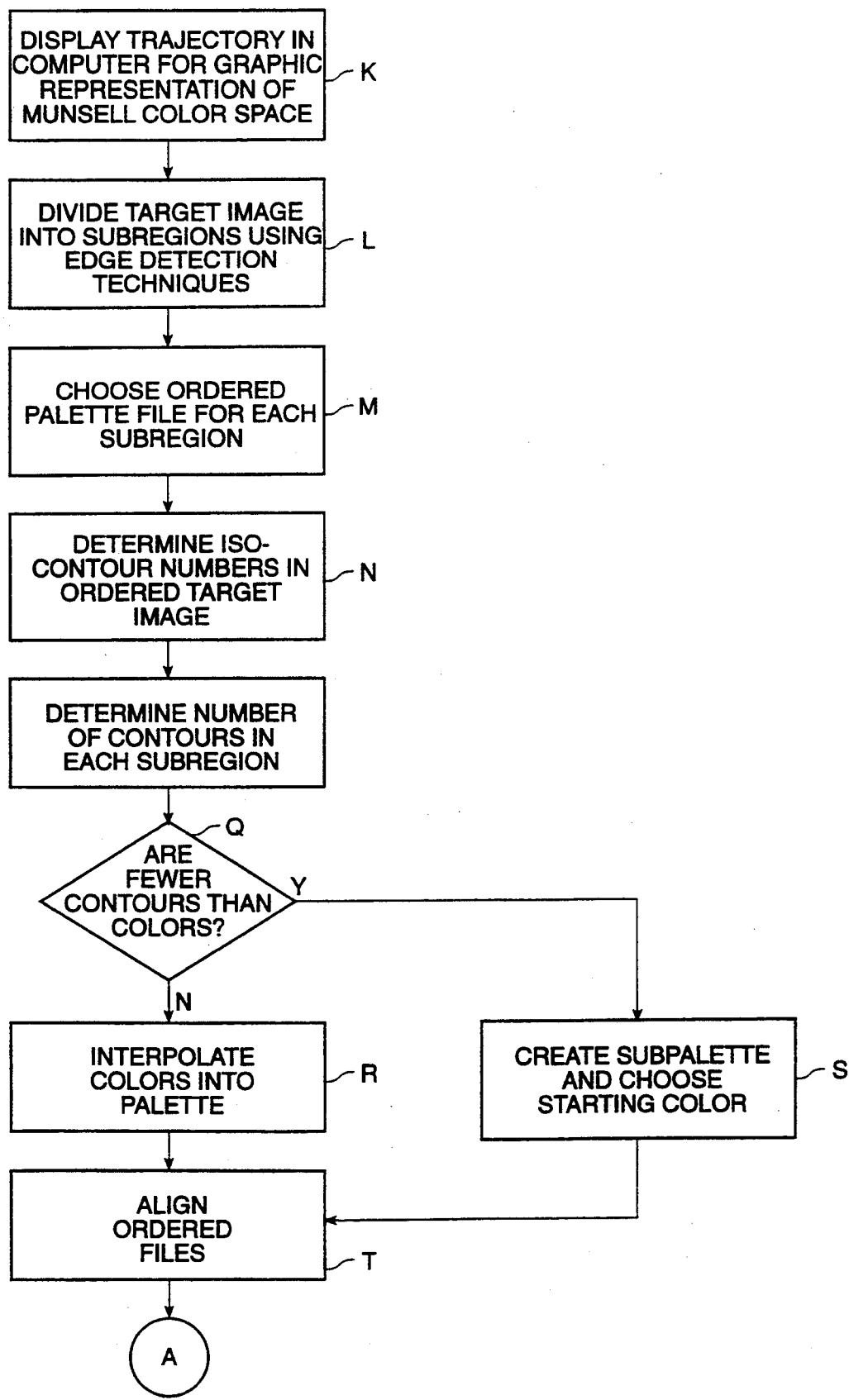
Figure 7B:
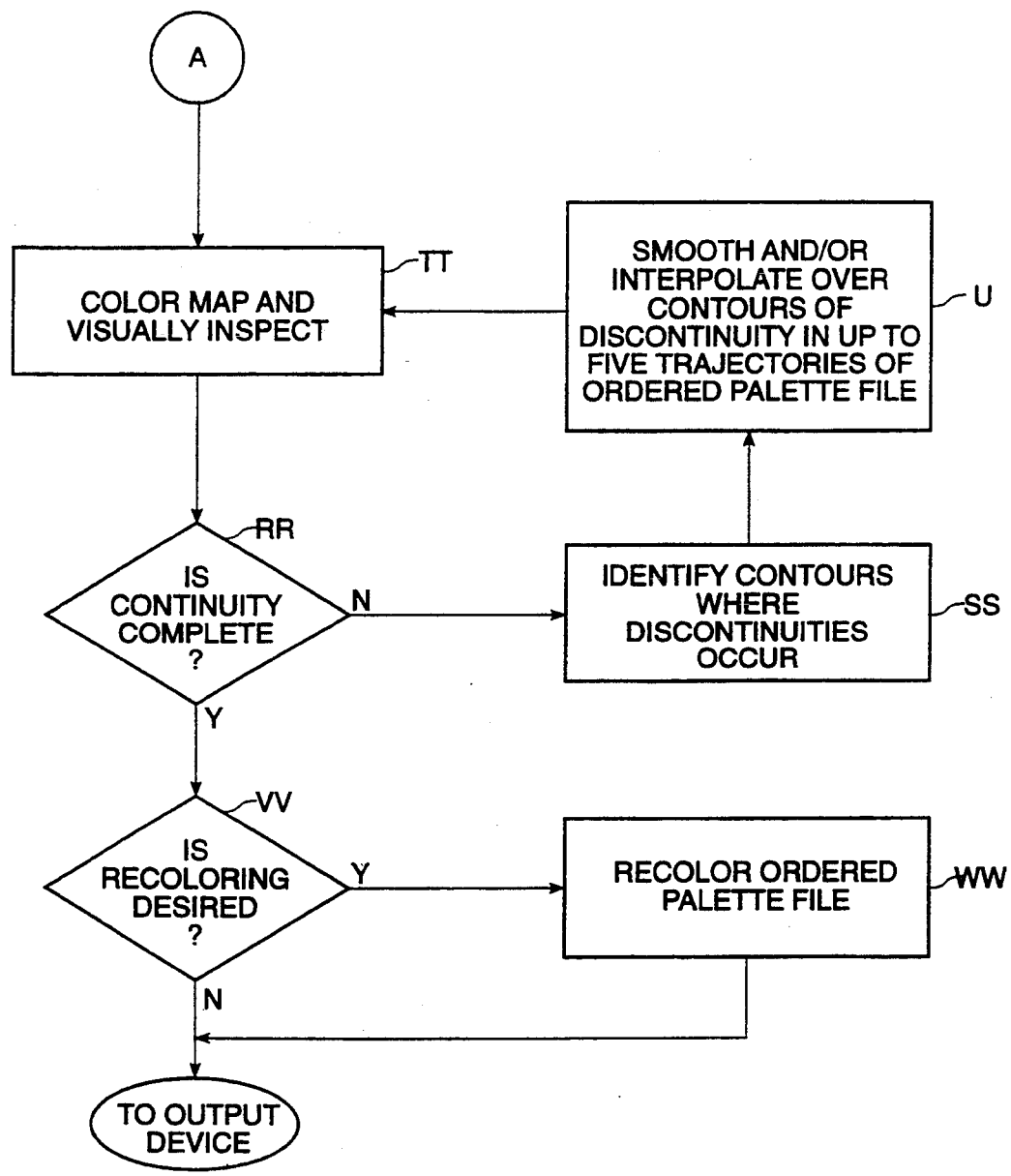

Referring to FIG. 5, the process of colorizing a target image is illustrated. A preferred method of representing the color trajectory 42 as graphs would be to display a three-dimensional perspective representation in color space as a three-dimensional object (Step K). Each point on this graph would represent the hue, saturation, and value components of color in the three-dimensional color space. This can be readily accomplished using 3D computer graphics technology.

Any diagonal of the circle of hues sliced through the cylinder exposes a plane of constant hue varying in a two dimensional space of saturation and value. Any slice through the cylinder normal to the value axis corresponds to a circular surface of constant brightness.

To facilitate alignment of the trajectory 42 with any color in color space 40 with a map 28 (FIG. 2a) to be colorized, it is helpful to close the trajectory 42 with a closing segment 44 to form an orbit 46 (Step L). Colors are sorted relative to a zero or black reference established on the orbit 46 as a baseline reference, and the orbit 46 is rescaled to 256 possible positions. In addition, to set the "inside" color and outside "color" in a mathematically-generated target image 28 bounded by an indecision region 47, the last position in the orbit 46 before the arbitrarily-selected starting position may be set at the value for black (or any other selected color) to represent that region 48 (FIG. 2a) in the target image 28 from which orbits never escape. The closed ordered file representing the orbit in third storage means 27 is thereby created.

Thereafter, iso-feature (iso-color) regions in the exemplary target image 28 (FIG. 2a) are identified to determine which are large or medium in size (Step M). Then the orbit represented by the closed ordered file in third storage means 29 is aligned with the ordered map file in fourth storage means 32 (e.g., target image 28) by choosing the starting point on the orbit and simply matching the two files by number (Step N).

Trajectories 42 are often jagged because the color sampling process discards some of the colors in the original image or object. The actual shape of the trajectory between the sampled points is therefore unknown. The distance in color space between successive colors in the ordered color file can be greater than the closest colors in the original image. The jagged paths in the ordered color file correspond to transitions between colors in color space that are too sharp for smooth transitions because of sampling at insufficient resolution.

Interpolation is used for increasing the resolution of an orbit 46 corresponding to selected regions of a target image 28 to which the ordered file of orbit 46 is mapped (Step O). This is particularly useful for large-sized iso-feature regions 54, 56.

For medium-sized iso-feature regions 50, 52 of a target image 28, interpolation is not satisfactory because the resultant color transitions are too close in feature characteristic (color) to adjacent iso-feature regions. These regions are best colored by an orbit which has been subjected to a smoothing process (Step P).

A theorem in fractal geometry called the Shadowing Theorem shows how a jagged trajectory can be approximated with a smooth curve. By making the reasonable assumption that actual trajectory in color space of a full twenty-four-bit image is the smoothest graph containing all of the 256 points in the ordered file stored in third storage means 29 allows use of the Shadowing Theorem to produce an approximation of the shape of the full color trajectory of an image or object.

In order to achieve eye-pleasing effects in medium-sized iso-color regions, it is preferred that the Shadowing Theorem be applied to smooth the orbit corresponding to those mid-sized iso-color regions.

The application of the Shadowing Theorem may be as follows: A smooth curve is drawn to approximate a region to be examined, and then several straight line segments are used to approximate the curve, then a region of the curve containing "n" points is picked, and the distance between the starting and ending points in color space is determined along the segments approximating the original trajectory using the distance function in three-space and the trajectory is converted into equally-distanced steps along the segments of the curve. The colors then currently between the starting and ending colors are replaced with the same number of colors, but positioned at regular (smoothed) intervals between the starting and ending colors in the region. By smoothing the trajectory of colors in this way, it is possible to greatly improve the aesthetics of the color transitions without loosing any of the richness of the colors derived from the input source image from which the colors derive.

The colorized target image stored as a colorized map file is ready for inspection upon completion of the colorizing process (Step Q). The inspection step is typically a manual step to check to see if there is continuity satisfactory aesthetically, as machines are not yet good judges of aesthetics (Step R). Those segments of the orbit which correspond to the discontinuities in the colorized map are then revisited (Step S), and the segments of the orbit which are so identified are subjected to a final interpolation step (Step T). Steps (Q–T) are repeated as frequently as necessary to satisfy taste, and then the accepted output is directed to an output device, as described hereinabove (Step U).

OTHER APPLICATIONS

The invention has thus far been explained with specific reference to color sources. However, the invention can be generalized to applications using other sources of input. For example, one source of input might be natural textures encoded as iterated function systems. Barnsley, U.S. Pat. No. 4,941,193, column 13, discloses for example an IFS coded image (Equations 1–3) wherein six coefficients are used to describe a contraction mapping of an object for a deterministic rendering, the contraction mapping being useful for rendering the object by a recursive process. Recognizing this, the present invention allows the expression of a point in a multidimensional space (specifically, six dimensions corresponding to the six coefficients). Each contraction mapping $W_i$ is useful to describe an object with a specific texture. The collage of the contraction mappings $W_1$–$W_N$ may be used to describe more complex images of a collage of objects, each with a specific texture, and the textures can be ordered in the same way that colors have been ordered in the previous examples. Thus, the present invention may be expressed as a method for preparing ordered sets of terms expressible in a multidimensional space from a source of information for use in mapping the information onto an ordered pattern into a lower dimensional order of space.

CONCLUSION, RAMIFICATIONS, AND SCOPE

This invention provides powerful new tools for the manipulation of ordered sets of information, such as color, the full range of which may not be fully known at this time. For example, the invention allows mathematical maps, landscapes, computer generated plants, and organisms to be colored in any natural or artificial color scheme. It allows images to be ordered on the basis of iso-featured contours and then to be processed in a variety of new ways involving mapping of spatial variables. The invention also allows remarkable color effects to be added to any variable map. The method can be used in conjunction with fractal image compression and coding to produce remarkable effects. The invention allows a color palette from a natural object to be analyzed and transferred to mathematical maps and computer painting in general. It can provide new tools for the use of color in computer paint programs. It can provide new color effects for pure and applied art, with uses in the textile, advertising, packaging, computer and entertainment industries. It can provide a unique ability to color customize product lines and mathematical maps. For video, it can provide novel color transitions which would allow new dynamic effects.

The invention has been explained with reference to specific embodiments. Other embodiments will be apparent to those of ordinary skill in the art upon reference to this disclosure. For example, the process of ordering variables in a multidimensional space need not be limited solely to the applications relating to the analysis of color or the expression of information using color as a metric. A similar process can be used to generate fractal interpolation functions from information represented by a set of sampling points in a multidimensional space which have a path through the multidimensional space and to order the information in a lower dimension, ultimately expressing the information in as low as one dimensional space while preserving order and permitting interpolation between sampling points. The process thus has applications to certain classes of data compression and analysis, as well as to the color-related fields mentioned herein. It is therefore not intended that this invention be limited, except as indicated by the appended claims.

What is claimed is:

1. A method using a computer for preparing ordered sets of colors expressible in a three-dimensional color space from a source of information for use in mapping the information onto an ordered pattern in a lower dimensional image space, such as a two-dimensional physical surface, the method comprising the steps of:
    (a) digitizing the source of information for generating a digitized image file; thereafter
    (b) sampling the digitized image file for generating a color sample file;
    (c) converting the color sample file to obtain color value, saturation and hue terms as a set of coordinate color points in the color space; thereafter
    (d) storing the set of color points and its terms in a source file of a first memory means;
    (e) establishing black as a current reference point; thereafter
    (f) calculating a set of distance values in the color space between each color point of the source file and the current reference point and storing the set of distance values in a list file in a second memory means;
    (g) selecting the color point having the minimum distance value,
    storing this color point at the current bottom of an ordered color file of a third memory means and establishing this color point as the current reference point;
    (h) removing said current reference point from the set of color points in the source file; thereafter
    (i) repeating steps (f) through (h) until the source file is empty, in order to obtain a full range ordered color file in said third memory means; thereafter
    (j) filling a target image with colors representative of the hue, saturation and value of the ordered color file to obtain a colored image comprising a distribution of colors over the target image; and
    (k) presenting the colored image through an output device for observation.

2. The method according to claim 1, further including the steps, after step (i), of:
    (i1) adding points in color space connecting the first ordered color point and the last ordered color point of said full range ordered color file and rescaling to a preselected number of points relative to a reference color in order to obtain a closed ordered color file; and
    (i2) storing said closed ordered color file in a fourth memory means for use in filling the target image.

3. The method according to claim 2, further including the step, after step (i1), of:
    (i1a) smoothing across adjacent features of the closed ordered color file.

4. The method according to claim 3, further including the steps, after step (i1a), of:
    (i1b) interpolating between ordered color points in the closed ordered color file to obtain interpolated points; and
    (i1c) inserting the interpolated points in color order into the closed ordered color file.

5. The method of claim 1 wherein the target image is derivable from a compressed IFS code.

6. The method of claim 1 wherein the target image is a random fractal surface.

7. The method of claim 1 wherein the target image is a dynamical system mapped image sorted according to like colors.

8. The method of claim 1 wherein the target image is a bitmapped image sorted according to like colors.

9. An apparatus, including a central processing unit, for preparing ordered sets of colors expressible in a three-dimensional color space from a source of color information for use in mapping the color information onto an ordered pattern in a lower dimensional image space, such as a two-dimensional physical surface, the apparatus comprising:
    (a) a digitizer for converting the source of color information into a digital file;
    (b) a first memory means coupled to said digitizer for storing the digital file;
    (c) means for sampling the digital file to create a color sample file;
    (d) a second memory means coupled to said sampling means for storing the color sample file;

(e) means in said central processing unit coupled to said second memory means for converting said color sample file into a set of color points, each color point having a color value, saturation and hue term;

(f) a third memory means coupled to said central processing unit for storing the set of color points in a color point source file;

(g) means in said central processing unit coupled to said third memory means for establishing a current reference point;

(h) means in said central processing unit for initializing said current reference point to black;

(i) means in said central processing unit coupled to said third memory means for calculating a set of distance values in the color space between each color point of the set of color points and the current reference point;

(j) a fourth memory means for storing the set of distance values;

(k) means in said central processing unit for selecting the color point having the minimum distance value, storing this color point at the current bottom of an ordered color file of a fifth memory means, and establishing this color point as the current reference point;

(l) means in said central processing unit coupled to said third memory means for removing said current reference point from the set of color points in the color point source file;

(m) means in said central processing unit for repeatedly calculating said distance values, storing and removing until the color point source file is empty, in order to obtain a full range ordered color file of ordered color points for storing in said fifth memory means;

(n) means in said central processing unit for filling a target image with colors representative of the hue, saturation and value of the ordered color points to obtain a colored image comprising a distribution of colors over the target image; and (o) an output device coupled to said central processing unit for presenting the colored image for observation.

10. The apparatus according to claim 9, further including:

(m1) means for adding points in color space connecting the first ordered color point and the last ordered color point of said full range ordered color file and for rescaling to a preselected number of color points relative to a reference color in order to obtain a closed ordered color file; and (m2) a sixth memory means for storing said closed ordered color file for use in filling the target image.

11. The apparatus according to claim 10, further including:

(m1a) means for smoothing across adjacent features of the closed ordered color file.

12. The apparatus according to claim 11 further including:

(m1b) means for interpolating between ordered points in the closed ordered file to obtain interpolated points; and (m1c) means for inserting the interpolated points in color order into the closed ordered color file.

13. A method using a computer for preparing ordered sets of terms expressible in a multidimensional space from a source of information for use in mapping the information onto an ordered pattern in a lower dimensional order of space, the method comprising the steps of:

(a) digitizing the source of information for generating a digitized image file; thereafter (b) sampling the digitized image file for generating a color sample file;

(c) converting the color sample file to obtain terms representative of coordinates of a set of color points in the multidimensional space; thereafter (d) storing the set of color points and its terms in a source file of a first memory means;

(e) establishing black as a current reference point; thereafter (f) calculating a set of distance values between each color point of the source file and the current reference point in the multidimensional space and storing the set of distance values in a list file in a second memory means;

(g) selecting the color point having the minimum distance value, storing this color point at the current bottom of an ordered color file of a third memory means and establishing this color point as the current reference point;

(h) removing said current reference point from the set of color points in the source file; thereafter (i) repeating steps (f) through (h) until the source file is empty, in order to obtain a full range ordered color file in said third memory means; thereafter (j) filling a target image with features representative of the terms of the ordered color points in the full range ordered color file to obtain a featured image comprising a distribution of features over the target image; and (k) presenting the featured image through an output device for observation.

14. The method according to claim 13, further including the steps, after step (j), of:

(j1) adding points in the multidimensional space connecting the first ordered point and the last ordered point of said full range ordered file and rescaling to a preselected number of points relative to a reference point in order to obtain a closed ordered file; and (j2) storing said closed ordered file in a third memory means for use in filling the target image.

15. The method according to claim 14, further including the step, after step (j1), of:

(j1a) smoothing across adjacent features of the closed ordered file.

16. The method according to claim 15, further including the steps, after step (j1a), of:

(j1b) interpolating between ordered points in the closed ordered file to obtain interpolated points; and (j1c) inserting the interpolated points in order into the closed ordered file.

17. The method of claim 13 wherein the target image is derivable from a compressed IFS code.

18. The method of claim 13 wherein the target image is a random fractal surface.

19. The method of claim 13 wherein the target image is a dynamical system mapped image sorted according to like colors.

20. The method of claim 13 wherein the target image is a bitmapped image sorted according to like colors.

21. The apparatus of claim 9 wherein said digitizer is an image scanner.

22. The apparatus of claim 9 wherein said digitizer is a video camera with a frame grabber.

* * * * *